United States Patent [19]

Anson

[11] Patent Number: 4,468,879
[45] Date of Patent: Sep. 4, 1984

[54] FISHING LURE

[76] Inventor: Jay S. Anson, 604 NE. 29 Drive Apt. C, Fort Lauderdale, Fla. 33334

[21] Appl. No.: 194,740

[22] Filed: Oct. 7, 1980

Related U.S. Application Data

[63] Continuation of Ser. No. 003,732, Jan. 15, 1979, abandoned, which is a continuation of Ser. No. 807,836, Jun. 20, 1977, abandoned.

[51] Int. Cl.³ .............................................. A01K 85/01
[52] U.S. Cl. .................................. 43/42.06; 43/42.23; 43/42.5
[58] Field of Search .................. 43/42.06, 42.08, 42.23, 43/42.5, 42.51, 42-52

[56] References Cited

U.S. PATENT DOCUMENTS

| | | | |
|---|---|---|---|
| 1,314,052 | 8/1919 | Dubrow | 43/42.52 |
| 1,422,457 | 7/1922 | McClanahan | 43/42.5 X |
| 1,425,951 | 8/1922 | Eggleston | 43/42.51 |
| 2,507,454 | 5/1950 | Nelson | 43/42.52 X |
| 2,507,772 | 5/1950 | Cummins | 43/42.52 |
| 2,787,075 | 4/1957 | Baum | 43/42.5 |
| 2,803,916 | 8/1957 | Winter | 43/42.52 |
| 3,221,435 | 12/1965 | St. Amant | 43/42.5 |
| 3,497,986 | 3/1970 | Bianco | 43/42.5 |
| 3,643,369 | 2/1972 | Jacobson | 43/42.5 |

Primary Examiner—Nicholas P. Godici
Assistant Examiner—Charles L. Willis

[57] ABSTRACT

A dual purpose fishing lure system composed of a bent strip of metal having a hole at each end and one elongated in the mid-portion with a hook attached to the strip of metal. The lure is designed so that either end may be attached to a towing fishing line to provide two different types of action of the fishing lure. When the towing line and hook are attached at the same end and the hook passes through the elongated hole on the lure, the rear portion of the lure will spin, creating the appearance of a fluttering tail action. When the towing line is attached to the other end of the lure and the hook is removed from the central hole and allowed to drag behind while, the lure will move through the water simulating the wiggling, wobbling, darting action of a live baitfish. Regardless of where the towing line is attached, one hole is left open through which water may pass to produce fish attracting sound vibrations.

1 Claim, 4 Drawing Figures

FISHING LURE

This is a continuation of copending application Ser. No. 003,732, filed Jan. 15, 1979, which in turn is a continuation of application Ser. No. 807,836, filed June 20, 1977, both now abandoned.

BACKGROUND OF THE INVENTION

This invention relates to fishing lures and more particularly to a fishing lure which simulates two distinctly different types of action.

The prior art reveals a multitude of spoon type artificial lures of various shapes and sizes. The different shapes of each lure is designed to simulate a different motion and each motion is intended to attract fish in some way. Lures have been developed which simulate either the fluttering tail action or the wobbling, darting action of a bait fish. However, it has been necessary to have separate lures to simulate each type of action.

SUMMARY OF THE INVENTION

This invention relates to a dual purpose fishing lure system composed of a spoon or a bent strip of metal having a small hole at each end and an elongated hole adjacent the mid-portion. A hook is attached to the strip of metal. The lure is designed so that either end may be attached to a fishing line to provide two different types of motion when dragged through the water. When the towing line and hook are attached at the same end and the hook also passes through the central hole on the lure, the rear portion of the lure will spin, creating the appearance of a fluttering tail action. When the towing line is attached to the other end of the lure and the hook is removed from the central hole and allowed to drag behind the spoon, the lure will simulate a wiggling, wobbling, darting baitfish. Regardless of where the towing line is attached, one hole is left open through which water may pass to produce a fish attracting sound vibrations.

The primary object of this invention is to present a fishing lure which is capable of simulating two distinctly different types of motion when pulled through the water.

Another object is to present a fish lure whose motion simulates either the fluttering of a fish tail or the erratic motion of a wounded fish to attract fish into attacking the lure.

These together with other objects and advantages will become apparent to those skilled in the art upon reading the details of construction and operation as more fully setforth hereinafter, reference being had to the accompanying drawings forming a part hereof, wherein like numerals refer to like parts throughout.

DETAILED DESCRIPTION OF PREFERRED EMBODIMENT OF THE INVENTION

Before the present dual purpose fishing lure system is specifically described, it is to be understood that the invention is not limited to the particular shape or arrangement of parts here shown, as such devices may vary. It is also to be understood that the phraseology or terminology herein used is for purposes of description and not of limitation, as the scope of the present invention is denoted by the appended claims.

Figure 1:
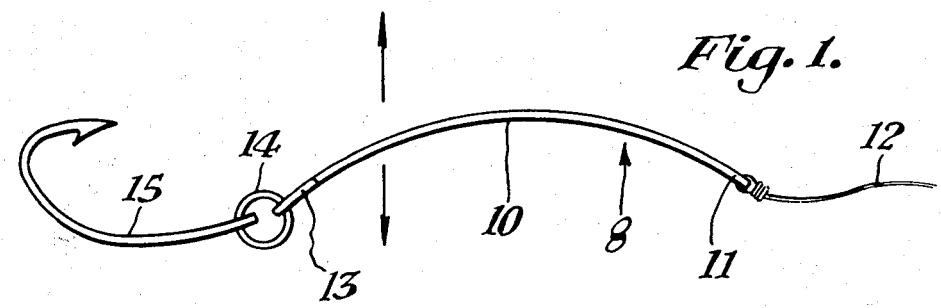
FIG. 1 is a side view of the lure showing the trapping hook in one position trailing behind the lure and a towing line at the other.

Referring now to the drawings and more particularly to FIG. 1, the dual purpose fishing lure system 8 is shown from the side. The body of the lure 10 is composed of a strip of metal about 5 cm in length, 1 cm in width and 0.1 cm thick. The tail 13 of the lure is generally flat. The rest of the body is bent away from the plane of the tail. The head 11 of the lure is connected to a towing fishing line 12. The tail 13 of the lure is connected to a ring 14 which is formed from tightly spiralled piece of metal thus the ring 14 can be easily removed from the lure. Various types of hooks 15 can be attached to the ring.

Figure 2:
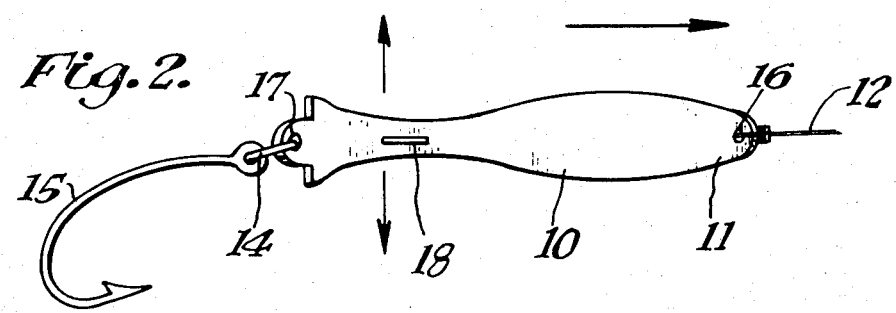
FIG. 2 is a top view of the lure shown in FIG. 1.

Referring now to FIG. 2, the top view of the lure. The hole 16 to which the line 12 is attached and the hole 17 to which the ring 14 is attached are at opposite ends of the lure. The elongated hole 18 is also now apparent. As the lure is pulled forward in the direction of the arrow, water rushes through the hole creating a sound which attracts fish. As the lure is pulled through the water, the body 10 moves irregularly from side to side in the direction of the arrows and up and down vertically as shown in FIG. 1 by the arrows.

Figure 3:
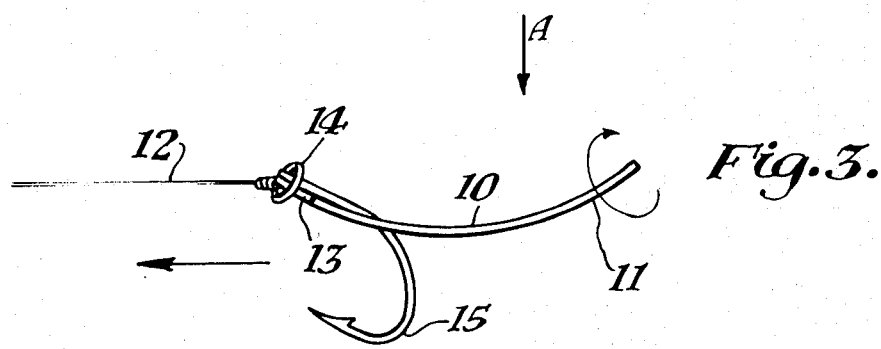
FIG. 3 is a side view of the fish lure showing the hook in another position passing through the central hole located between the end holes.
Figure 4:
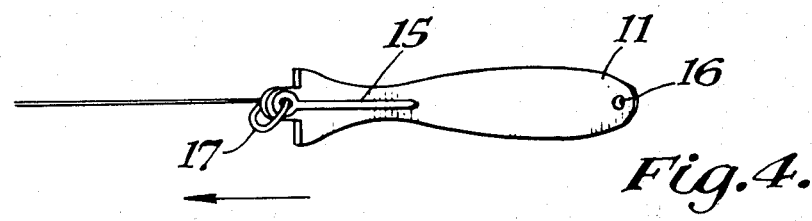
FIG. 4 is a top view of the lure shown in FIG. 3.

Referring now to FIG. 3, the hook 15 has been repositioned on the lure by removing it from the ring 14 and passing it through the hole 18 and reconnecting it to the ring in hole 17. The line 12 has been disconnected from the hole 16 and reconnected to the ring 14. The lure can now be dragged through the water in the direction of the arrow. As the lure is dragged along, water passes through hole 16 and creates a sound which attracts fish. The new hook placement is forward of the center of gravity so that while the lure is pulled along the head 11 spins around as shown by the arrow. This spinning motion is so rapid that it simulates the fluttering motion of a fish tail.

The instant invention has been shown and described herein in what is considered to be the most practical and preferred embodiments. It is recognized, however, that departure may be made therefrom within the scope of the invention and that obvious modifications will occur to a person skilled in the art.

What I claim is:
1. A fish lure, comprising:
   a curved body of generally flat sheet of material of generally uniform thickness with head, trunk, and tail portions, said body having an elongated shape with two ends,
   a first opening in one end nearest said tail portion and second opening in the other end of said body,
   an elongated opening positioned centrally in said body, said elongated opening lying generally along the longitudinal center line of said body generally at the narrowest part of said body,
   said body tapering from a smallest width adjacent said elongated opening toward a larger width adjacent the head and tail portions of said body,
   said tail portion includes projecting fins, a hook including an eye at one end and a barb at the other end, said hook connected to said first opening of said body, and said body sized and shaped to spin about the longitudinal center line of said body when towed through the water in one longitudinal direction, said body sized and shaped to wobble in a vertical motion and wiggles in a horizontal motion when towed through the water in the opposite longitudinal direction, said hook has shank portion between said eye and said barb, said eye of said hook is connected to said first opening and said shank portion is connected through said elongated opening.

* * * * *